United States Patent

[11] 3,607,178

| [72] | Inventors | Brook J. Dennison<br>Pittsburgh;<br>Albert A. Doutt, Tarentum, both of Pa. |
|---|---|---|
| [21] | Appl. No. | 760,982 |
| [22] | Filed | Sept. 19, 1968 |
| [45] | Patented | Sept. 21, 1971 |
| [73] | Assignee | PPG Industries, Inc.<br>Pittsburgh, Pa. |

[54] TREATING GLASS SHEETS USED IN LAMINATED SAFETY GLASS WINDSHIELDS
9 Claims, No Drawings

[52] U.S. Cl. .................................................. 65/30, 65/62, 156/106
[51] Int. Cl. ........................................................ C03c 21/00
[50] Field of Search ............................................ 65/30; 156/106

[56] References Cited
UNITED STATES PATENTS

| 3,389,047 | 6/1968 | Lavin ........................... | 161/199 |
| 3,395,999 | 8/1968 | Lewek .......................... | 65/30 |
| 3,396,075 | 8/1968 | Morris ......................... | 65/30 X |

*Primary Examiner*—S. Leon Bashore
*Assistant Examiner*—John H. Harman
*Attorney*—Chisholm and Spencer

ABSTRACT: Rinsing glass sheets prior to their lamination in water having a hardness in a controlled range, preferably between about 200 and about 400 parts by weight of calcium and/or magnesium expressed in terms of calcium carbonate per million parts by weight of water and preferably containing a mixture containing more calcium ions than magnesium ions.

TREATING GLASS SHEETS USED IN LAMINATED SAFETY GLASS WINDSHIELDS

This invention relates to TREATING GLASS SHEETS USED in laminated SAFETY GLASS WINDSHIELDS, and particularly relates to rinsing glass sheets before they are laminated to a sheet of plasticized polyvinyl butyral to form a laminated windshield.

Laminated safety-glass comprises two or more glass sheets laminated to opposite sides of an interlayer of a transparent, adherent plastic. The usual plastic interlayer is a plasticized polyvinyl acetal resin formed in a sheet or film with a thickness of about 0.015 inch (15 gauge) or more. The major commercial use of those safety-glass compositions is for automobile windshields, aircraft windshields and the like.

Year by year, the number of accidents involving automobiles has increased. So has the area of automobile windshields. These factors make safer laminated safety-glass windshields more necessary than ever.

Windshields are used to protect passengers from being struck by objects that strike the vehicle from the outside and also to prevent occupants from penetrating the windshield on impact after a sudden stop. Occupants can be injured seriously when an outside body strikes and penetrates the windshield and also when such impact breaks the windshield into flying glass fragments.

The plastic interlayer adheres to the glass particles to inhibit their release from the windshield as a result of a collision. When a laminated windshield is impacted, its flexible interlayer yields to absorb energy on impact. This characteristic decreases the possibility of serious injury which may occur when an object within the vehicle, such as an occupant's head, strikes the windshield. This interlayer resiliency also improves the resistance of the glass windshield to penetration by outside objects.

The interlayers in present day commercial windshields usually contain about 0.1 to 0.8 percent moisture content. Additional moisture content of the plastic interlayer is associated with increased resistance to penetration. However, increasing the moisture content of the interlayer to improve the penetration resistance sufficiently is impractical beyond the limits mentioned because the clarity of the windshield is adversely affected by the formation of bubbles between the interlayer and the glass or within the interlayer at high moisture content.

Furthermore, the presence of excess moisture may cause delamination. Consequently the automotive glass laminating technologists have not taken significant advantage of this method of improving resistance to penetration in settling for a compromise by using an intermediate amount of moisture content, such as 0.3 percent to 0.6 percent, to improve the penetration resistance to some extent while avoiding the problems incidental to the incorporation of excessive moisture in the interlayer sheet.

Prior to this invention, alkaline materials such as sodium and potassium hydroxides or alkaline salts prepared from these alkali bases and an acid have been added to polyvinyl acetal interlayers to stabilize the resin and/or to improve impact strength. However, these alkaline materials, when present at higher titer levels, discolor the resin at high temperatures. Therefore, this type of treatment is limited in the improvement it affords. A laminate is still needed having improved penetration resistance without having the treated laminate become discolored under high temperature conditions.

The principal object of this invention is to provide a simple treatment for glass sheets prior to their lamination that further improves the resistance to penetration of a laminated safety glass windshield by impacting objects such as the human head over the prior art improvements obtained from various interlayer treatments.

According to the present invention, the hardness of the water used to rinse the glass sheets before they are laminated is adjusted to a desired hardness by measuring the hardness of a sample of said water and adding a sufficient amount of concentrated solution of soluble calcium and/or magnesium salts, preferably one containing a mixture of calcium and magnesium ions containing more calcium ions and fewer magnesium ions to increase the hardness of the water to a target level.

Prior to the present invention, tests called Mean Break Height tests have been devised to determine the resistance to penetration of glass-plastic laminates. These tests are based on the minimum requirements of the United States of America Standards Institute as expressed in test 5.26 of specification Z26.1—1966—American Standard Safety Code Safety Glazing Materials for Glazing Motor Vehicles Operating on Land Highways.

In essence, the Mean Break Height test comprises placing one of a group of laminates of similar construction in a horizontal position with a frame or edge support and while maintaining a constant laminate temperature, which is 70° Fahrenheit in this series, allowing a 5 pound spherical ball to drop from a designated height against approximately the middle of the laminate made with a polyvinyl butyral interlayer having a thickness of 0.030 inch (30 gauge). This test is repeated at increasing ball-drop heights to determine the approximate height in feet at which 50 percent of the laminates tested will resist penetration. In other words, the Mean Break Height of a laminate is a measure of the ability of that laminate to absorb the energy of an impacting object. Usually, a group of 10 laminates, as identical to one another as possible, is used to determine the Mean Break Height of the particular construction tested. Larger groups may be tested.

It has been observed that the Mean Break Height of laminates produced by bending and laminating glass sheets that were rinsed in city water prior to lamination was greater than that of laminates composed of glass sheets that were rinsed in demineralized water before lamination. However, even though this discovery led to the use of relatively inexpensive city water rather than more expensive demineralized water in the final rinse to which the glass sheets were subjected, the seasonal variation in the hardness of city water used made it impossible to predict the safety of the laminated windshields as determined by the results of Mean Break Height tests. The present invention suggest adding an amount of a concentrated aqueous solution of a salt of a metal taken from the class consisting of calcium, magnesium and mixtures thereof in sufficient amount to raise the hardness level to a desired level. The hardness level is expressed in terms of parts of calcium carbonate by weight compared to 1 million parts of solution, even though the preferred concentrated additive solution contains a mixture of highly soluble salts of calcium and magnesium. Calcium chloride and magnesium sulfate are preferred as the sources of increasing the hardness of the water used to treat the glass, because they are readily soluble in water and are less expensive and more readily obtainable in the market than other salts of calcium and magnesium.

The present invention has resulted from an extended testing program involving the fracture of hundreds of test laminates to determine the Mean Break Height of various assemblies of glass and plastic where the sets tested differed from one another in the hardness of the water treatment and all other variables kept as constant as possible. It was determined to be impossible to maintain the characteristics of interlayer material constant, even when supplied by the same manufacturer. Therefore, in each experiment described below, the comparisons are made from test results on laminates prepared using interlayer material from a single roll.

Before describing the various experiments, a review of typical commercial glass bending and laminating techniques is in order. Glass sheets are cut from a ribbon of glass into rectangular shapes before bending. According to one technique, glass sheets are cut to outline in pairs having slightly different configurations before bending, the sheets are washed and rinsed with water, a spray comprising an aqueous slurry containing finely divided particles of a parting material is applied to a major surface of one sheet of the pair to prevent the sheets from sticking together during bending and the pair of sheets is mounted on a glass sheet bending mold of the outline type with the surface to which the parting material is applied serving as an interfacial surface between the pair of glass sheets. The parting material is preferably of a material having an index of refraction approximating that of the plastic interlayer after lamination, such as mica or a diatomaceous earth, so that the pair of bent glass sheets need not be washed after bending to remove the parting material. The bent sheet pairs are ready for assembly and lamination after bending without any further treatment.

In another bending method in use at present, the rectangular glass sheet blanks are washed, then parting material, which is preferably water soluble, is applied to an interfacial glass surface and the glass sheets are bent in matched pairs. After bending, the bent sheets are cut to outline and rinsed to remove the water-soluble parting material and glass chips that result from cutting to outline after bending. The bent sheets are ready for lamination after the washing and drying that follows.

Pairs of bent glass sheets may be laminated to opposite sides of a sheet of thermoplastic interlayer material using any of many available methods regardless of the manner in which they are bent to shape. A typical operation involves assembling a pair of matched bent sheets with a sheet of interlayer material, preferably plasticized polyvinyl butyral, in an atmosphere of controlled temperature and humidity conditions. The assemblies are then prepressed, either by passing them while hot between a pair of rolls that force entrapped air and moisture from between the glass-plastic interfaces or by enclosing them in evacuating rings. The prepressed assemblies are then laminated at high pressure and temperature in an autoclave to produce an optically clear laminate. A preferred laminating process is disclosed and claimed in U.S. Pat. No. 2,948,645 to Laurence A. Keim, assigned to PPG industries.

The present invention improves the impact resistance of laminated windshields regardless of the bending and laminating operations performed to produce the final result. In general, controlling the hardness of the water used to rinse the glass sheets prior to their lamination within the parameters recited below is associated with laminated windshields having greater Mean Break Heights than windshields comprising glass sheets treated with softer water.

The following examples are recited to illustrate how the impact strength of glass laminates may be improved by the treatment of the glass members of the laminate following the practice of this invention. The interlayers used in the following experiments were as similar to each other as possible while other characteristics were compared. There may have been differences in interlayers used from example to example, and in the experiments reported where interlayer materials of different suppliers and different moisture contents were compared, the differences were controlled as well as possible.

For each of the experiments reported below, glass samples 12 inches by 12 inches having a nominal thickness of one-eighth inch were cut. In some experiments, commercial plate glass of soda-lime-silica composition were used. In other experiments, tinted plate glass of soda-lime-silica composition containing about 0.5 percent by weight of iron oxide was used and in other experiments samples of clear and tinted float glass of soda-lime-silica composition similar to the corresponding plate glass compositions were used. To closely simulate production washing operations, all of the glass samples were first washed in hot city water whose hardness varied between about 106 and 147 parts per million based on calcium carbonate. The rinsing step involved treating the washed glass with water of various hardness. The temperature of the water was below its boiling point in all cases. Demineralized water had approximately zero hardness and the hardness ranged up to 1,000 parts per million in the various experiments performed. The glass sheets were conveyed on rolls for the washing and rinsing. To eliminate the possibility of having contamination from the rolls affect the glass surfaces contacting the rolls, the top surfaces of two adjacent glass sheets were placed in face-to-face relation when the pair of washed and rinsed sheets was taken off the conveyor. This relationship of the surfaces of each matched pair of sheets was maintained throughout the experimental program.

Before placing the sheets in face-to-face relation, one sheet of each of the matched pairs of glass sheets was exposed to a light application of an aqueous spray containing finely divided diatomaceous earth similar to that used in commercial operations.

The matched pairs of glass sheets were placed on rectangular supports of outline configuration and passed through a lehr where the glass was heated to simulate a glass bending operation. The glass sheet of each pair treated with diatomaceous earth was the lower sheet of the pair. After the aforesaid heat treatment simulating the heating in a bending lehr, each pair of heat-treated glass sheets was assembled to form a sandwich with a sheet of plasticized polyvinyl butyral of the high impact safety type 0.030 inch thick presently used in laminated safety glass. The assemblies were prepressed and then subjected to an autoclave cycle in which the glass assemblies were exposed for 45 minutes to a temperature of 275° Fahrenheit and 200 pounds per square inch pressure.

In the tables reporting the results of various experiments performed to determine the merits of various conditioning techniques for the glass sheets, the following nomenclature is used:

A or B refers to different suppliers of interlayer materials used in the experiments. These were all of the presently available plasticized polyvinyl butyral treated to control the alkalinity titer and made available in thickness of 0.030 inch (30 gauge). This interlayer has been standard interlayer material for laminated safety glass windshields produced for all new automobiles sold in the United States since the 1966 model year.

The term "MBH" refers to the Mean Break Height in feet as explained in the description of the Mean Break Height tests above.

The term "Average Percent Moisture Content" refers to the weight percent of water vapor in the plasticized polyvinyl butyral sheeting used in the interlayers of the tested laminated samples.

The term "Clear Plate" refers to ordinary commercial soda-lime-silica plate glass, while "Clear Float" refers to a corresponding soda-lime-silica composition of commercial float glass. Correspondingly, the terms "Tinted Plate" and "Tinted Float" refer to soda-lime-silica compositions of commercial plate glass and float glass, respectively, that contain about 0.5 percent by weight of iron oxide. Such glass compositions resist the transfer of heat from one side of the glass sheet to the other side to a greater degree than clear glass compositions.

The term "PPN" refers to hardness of the water used in treatment expressed in terms of parts by weight of $CaCO_3$ per million parts of water.

EXAMPLE I

In the first experiment reported in table I below, four groups of 24 glass sheets each were first washed in demineralized water, then two groups were rinsed with city water having a hardness of between 106 and 112 parts per million and the other two groups untreated. One group subjected to each type of treatment was laminated to polyvinyl butyral from one supplier and the other group to that supplied from another supplier. The samples undertook Mean Break Height tests. Samples containing an interlayer from one supplier had better test results than samples containing an interlayer from another supplier. In addition, this test showed that the additional rinse in moderately hard water after the usual demineralized wash increased the penetration resistance of the laminates compared to samples that were not so additionally treated. The results appear in table I.

TABLE I

EFFECT OF WASHING GLASS IN CITY WATER ON PENETRATION RESISTANCE

| Glass Conditioning | Interlayer Supplier | Average % Moisture Content | MBH |
| --- | --- | --- | --- |
| Demineralized Water | A | 0.42% | 13.4 feet |
| City Water | A | 0.41 | 17.6 |
| Demineralized Water | B | 0.39 | 19.9 |
| City Water | B | 0.39 | 22.6 |

EXAMPLE II

In this experiment, 15 samples of each of three variations were tested. All of the 45 samples were subjected to a heat treatment simulating that of a glass bending lehr. One set of 15 samples were laminated without further treatment after the simulated lehr heating, another set of 15 pairs was subjected to steam before lamination while the glass sheets were separated for assembly before lamination and the third set of 15 pairs were submitted to a city water rinse using water having a hardness of 107 parts per million while the sheets were separated for assembly before lamination. Here, too, the Mean Break Height of test samples treated with moderately hard city water was significantly better than unrinsed or steam-treated samples.

When glass surfaces are subjected to high temperatures such as that achieved in a bending lehr (900° to 1,100° F.), the surfaces become dehydrated. This test was designed in part to determine if replacement of the water on the surface of the glass would increase the penetration resistance. In the evaluation of the exposure to steam, separated pairs of lehr treated glass were slowly passed over steam. This steam treatment of the glass after lehr treatment (with glass at room temperature) did not increase penetration resistance of the glass over that experienced with glass that was just lehr treated to any significant degree. The test results are shown in table II.

TABLE II

COMPARISON OF UNTREATED GLASS WITH GLASS WASHED AND STEAM-TREATED AFTER LEHR TREATMENT

| Glass Conditioning | Average % Moisture Content | MBH |
| --- | --- | --- |
| Untreated | 0.46% | 13.1 feet |
| Steam Treated | 0.44 | 13.7 |
| City Water Rinse | 0.46 | 19.3 |

EXAMPLE III

To determine the effect on penetration resistance of different amounts of water hardness before simulated lehr treatment combined with rinsing, steaming and no treatment after simulated lehr treatments, the following combinations of variables were investigated. All glass sheets were first washed in city water before the experiment.

GLASS SURFACE CONDITIONING

| Before Bending | After Bending |
| --- | --- |
| Demineralized water rinse | None |
| Demineralized water rinse | Demineralized water rinse |
| Demineralized water rinse | Steam |
| 200 p.p.m. hardness water rinse | None |
| 200 p.p.m. hardness water rinse | Demineralized water rinse |
| 200 p.p.m. hardness water rinse | Steam |
| 400 with diatomaceous earth | None |

For the glass that was steam treated after lehr treatment, the separated glass was at approximately 300° F. when it was subjected to the steam. A special parting material containing a diatomaceous earth suspension in water having a hardness of 400 parts per million was sprayed on one group of samples of glass prior to lehr treatment. The interlayer material for this experiment had a moisture content ranging between 0.34 percent and 0.39 percent and came from a single supplier to minimize extraneous variations. The wash water used prior to the glass conditioning steps enumerated had a hardness of 120 parts per million for this test. Each combination of steps tested in this program involved testing a set of 12 laminates treated by the sequence of steps described for each particular set.

A statistical analysis of the results of this study revealed that rinsing the glass with hard water before lamination was the most significant factor for improving the penetration resistance. Glass rinsed with hard water containing diatomaceous earth parting material showed the best penetration resistance, but significant improvement also occurred in those specimens treated with hard water before the lehr treatment. Table III contains a summary of the test results.

TABLE III

EFFECT OF VARIOUS COMBINATIONS OF GLASS SURFACE TREATMENTS ON PENETRATION RESISTANCE

| Before Simulated Lehr Treatment | Glass Conditioning After Simulated Lehr Treatment | MBH |
| --- | --- | --- |
| Demineralized Rinse | None | 12.2 feet |
| Demineralized Rinse | Demineralized Rinse | 13.2 |
| Demineralized Rinse | Steam | 13.6 |
| 200 p.p.m. Rinse | None | 14.0 |
| 200 p.p.m. Rinse | Demineralized Rinse | 14.0 |
| 200 p.p.m. Rinse | Steam | 16.1 |
| 400 p.p.m. Rinse with diatomaceous earth | None | 16.3 |

EXAMPLE IV

Another experiment was performed comparing one set of 24 samples untreated after simulated lehr treatment with another set of 24 samples that were subjected to a demineralized rinse after their simulated lehr treatment and before their assembly for lamination and with a third set where the glass sheets were rinsed with water having a hardness of 200 parts per million after the simulated bending and before their assembly preparatory to lamination. The results compiled in table IV shows no significant difference between laminates containing untreated glass and those containing glass rinsed in demineralized water after lehr treatment. However, those laminates of glass sheets treated with hard water showed significantly better penetration resistance.

TABLE IV

COMPARISON PENETRATION RESISTANCE OF LAMINATES

SUBJECTED TO DIFFERENT TREATMENTS AFTER SIMULATED BENDING

| Type of Glass Treatment after Simulated Lehr Bending | MBH |
| --- | --- |
| Untreated | 13.1 feet |
| Demineralized water rinse | 13.6 |
| Rinse in 200 p.p.m. hardness water | 20.5 |

EXAMPLE V

The previous test results showed penetration resistance improved for laminates containing glass sheets treated with the hard water rinse compared to the penetration resistance of untreated laminates and those formed of glass sheets rinsed with softer water. Efforts were then directed towards testing the effect of various hardnesses of rinse water treatments prior to lehr treatment without any surface treatment between simulated bending and assembly. The performance of laminates comprising clear plate glass and clear float glass that were rinsed with water having hardnesses of 200, 350 and 500 parts per million prior to lehr treatment were investigated. This test involved 24 samples tested at each of the different water hardnesses, or 72 samples in all. The interlayer was supplied by Supplier A and all samples were washed in city water having a hardness of 147 parts per million before the final rinse.

Laminates comprising polished plate glass sheets that were rinsed with the hardest water exhibited the highest penetration resistance. This was only slightly better than the laminates treated with water of a hardness of 350 parts per million. Both of these groups had penetration resistance significantly greater than the laminates comprising polished plate glass rinsed with water having the lowest hardness tested. The results for the polished plate glass showed an increase in penetration resistance as the rinse water hardness increased, but the overall results showed no significant increase in penetration resistance above hardness of 350 parts per million. The test results are summarized in table V.

TABLE V

EFFECT OF RINSE WATER HARDNESS BEFORE SIMULATED

BENDING ON PENETRATION RESISTANCE

| Type of Glass | Hardness of Water Rinse Before Lehr Treatment | MBH |
| --- | --- | --- |
| Clear Plate | 200 p.p.m. | 16.8 feet |
| Clear Plate | 350 | 17.9 |
| Clear Plate | 500 | 10.4 |
| All samples | 200 | 16.1 |
| All samples | 350 | 17.3 |
| All samples | 500 | 17.4 |

EXAMPLE VI

An experiment was conducted to determine the effect of interlayer moisture content and glass surface conditioning on the performance of laminates with interlayers obtained from supplier A. The glass surface conditioning study involved comparing laminates comprising glass sheets washed and rinsed with water having a hardness of 200 parts per million after lehr treatment with laminates composed of glass sheets having no wash and rinse after lehr treatment. The interlayer moisture contents were approximately 0.35 and 0.48 percent for each set of conditioning groups. At both moisture levels, the laminates comprising glass that was washed and rinsed with water of 200 parts per million hardness had greater penetration resistances than those for laminates containing glass that was not washed and rinsed after lehr treatment. The highest mean penetration resistance was in the samples washed and rinsed with water having hardness of 200 parts per million and laminated with plasticized polyvinyl butyral interlayer having 0.48 percent moisture content. All the glass sheets were washed in city water having a hardness of 105 parts per million before the lehr treatment and the plastic interlayer material used in this experiment had half its area dyed and the other half-clear. This experiment involved testing 48 samples, 12 in each set. A summary of the test results is shown in table VI.

TABLE VI

EFFECT OF MOISTURE CONTENT AND GLASS SURFACE

CONDITIONING ON PENETRATION RESISTANCE

| Glass Conditioning | Average % Moisture Content | MBH |
| --- | --- | --- |
| None | 0.35% | 9.4 feet |
| 200 p.p.m. Rinse | 0.34 | 18.6 |
| None | 0.47 | 19.4 |
| 200 p.p.m. Rinse | 0.48 | 22.3 |

EXAMPLE VII

Because the maximum hardness of water used to rinse the glass prior to bending in previous experiments was 500 parts per million, it was decided to investigate water hardnesses of 400, 700 and 1,000 parts per million. The variables investigated in this study are shown as follows:

1. Clear plate and tinted float glasses.
2. Both clear and tinted polyvinyl butyral plastic furnished by suppliers A and B.
3. Target moisture contents of 0.3, 0.4 and 0.55 percent.

In the first experiment, 10 samples of each variation of moisture content of clear interlayer material laminated to clear plate glass or a total of 180 laminates were tested and in the second experiment, 10 samples of each variation of moisture content of interlayer material having one-half dyed and one-half clear area laminated to tinted float glass or a total of 180 additional laminates containing float glass were tested. In all cases, the glass was first washed in city water having a hardness of 135 parts per million. For all 360 laminates tested in these experiments, the average MBH was 18.6 feet for laminates having glass treated with water of 400 parts per million hardness, 18.7 feet for laminates having sheets treated with water of 700 parts per million hardness and 19.0 feet for laminates having sheets treated with water of 1,000 parts per million hardness. The detailed test results for the two experiments are shown in table VII-A for plate glass laminates and table VII-B for float glass laminates, respectively.

TABLE VII-A

PERFORMANCE OF CLEAR PLATE GLASS LAMINATES

| Glass | Rinse | Interlayer Supplier | Average Moisture | MBH |
| --- | --- | --- | --- | --- |
| Clear Plate | 400 p.p.m. | B | 0.30% | 14.3 ft. |
| Clear Plate | 700 | B | 0.27 | 13.1 |

TABLE VII-A—Continued

| Clear Plate | 1,000 | B | 0.27 | 15.8 |
|---|---|---|---|---|
| Clear Plate | 400 | A | 0.40 | 18.5 |
| Clear Plate | 700 | A | 0.40 | 18.2 |
| Clear Plate | 1,000 | A | 0.35 | 19.3 |
| Clear Plate | 400 | B | 0.34 | 17.2 |
| Clear Plate | 700 | B | 0.34 | 16.6 |
| Clear Plate | 1,000 | B | 0.32 | 17.4 |
| Clear Plate | 400 | A | 0.42 | 18.2 |
| Clear Plate | 700 | A | 0.43 | 18.4 |
| Clear Plate | 1,000 | A | 0.42 | 19.3 |
| Clear Plate | 400 | B | 0.49 | 17.3 |
| Clear Plate | 700 | B | 0.47 | 18.9 |
| Clear Plate | 1,000 | B | 0.48 | 18.6 |
| Clear Plate | 400 | A | 0.54 | 19.4 |
| Clear Plate | 700 | A | 0.57 | 18.6 |
| Clear Plate | 1,000 | A | 0.56 | 20.2 |

TABLE VII-B

PERFORMANCE OF TINTED FLOAT GLASS LAMINATES

| Glass | Rinse | Interlayer Supplier | Average Moisture | MBH |
|---|---|---|---|---|
| Tinted Float | 400 p.p.m. | B | 0.31% | 19.7 ft. |
| Tinted Float | 700 | B | 0.32 | 19.4 |
| Tinted Float | 1,00 | B | 0.31 | 18.7 |
| Tinted Float | 400 | A | 0.35 | 18.9 |
| Tinted Float | 700 | A | 0.37 | 20.1 |
| Tinted Float | 1,000 | A | 0.38 | 19.3 |
| Tinted Float | 400 | B | 0.36 | 20.0 |
| Tinted Float | 700 | B | 0.37 | 19.1 |
| Tinted Float | 1,000 | B | 0.37 | 19.2 |
| Tinted Float | 400 | A | 0.42 | 20.0 |
| Tinted Float | 700 | A | 0.41 | 20.8 |
| Tinted Float | 1,000 | A | 0.43 | 19.4 |
| Tinted Float | 400 | B | 0.46 | 20.0 |
| Tinted Float | 700 | B | 0.48 | 21.0 |
| Tinted Float | 1,000 | B | 0.46 | 20.2 |
| Tinted Float | 400 | A | 0.52 | 20.2 |
| Tinted Float | 700 | A | 0.49 | 19.8 |
| Tinted Float | 1,000 | A | 0.49 | 21.1 |

It is interesting to report in passing that the float glass samples had an average Mean Break Height of 19.8 Feet compared to one of 17.2 feet for the plate glass laminates. This indicates that laminated windshields containing float glass are more resistant to penetration than laminates containing plate glass.

EXAMPLE VIII

To more thoroughly investigate and compare the performance of various glasses rinsed with water of 400 parts per million hardness prior to bending and laminated with interlayers from different suppliers at various moisture levels, additional 12 inch by 12 inch laminates of ⅛ inch thick glass sheets are fabricated and tested. The variables were as follows:
1. Clear plate glass, tinted plate glass, clear float glass and tinted float glass.
2. Clear interlayers and those having half their areas dyed to simulate dyed plastic from suppliers A and B.
3. Target moisture contents of 0.3, 0.4 and 0.55 percent. The test results revealed that rinsing the glass with water having a hardness of 400 parts per million prior to bending resulted in satisfactory penetration resistance performance, particularly at the lowest moisture contents tested (0.3 to 0.34 percent), and still maintained acceptable plastic to glass adhesion at highest moisture contents tested (0.50 –0.55 percent). The test results using 10 laminates per variation are reported in tables VIII-A and VIII-B.

TABLE VIII-A

PERFORMANCE OF CLEAR PLATE AND FLOAT GLASS LAMINATES

| Glass | Interlayer Supplier | Average % Moisture | MBH |
|---|---|---|---|
| Clear Plate | B | 0.34% | 17.5 ft. |
| Clear Plate | B | 0.40 | 19.3 |
| Clear Plate | B | 0.52 | 19.4 |
| Clear Plate | A | 0.33 | 18.2 |
| Clear Plate | A | 0.40 | 20.3 |
| Clear Plate | A | 0.56 | 20.0 |
| Clear Float | B | 0.35 | 19.5 |
| Clear Float | B | 0.43 | 21.2 |
| Clear Float | B | 0.53 | 20.4 |
| Clear Float | A | 0.35 | 19.6 |
| Clear Float | A | 0.44 | 21.4 |
| Clear Float | A | 0.53 | 23.0 |

Table VIII-A shows the test results of the laminates containing interlayers of clear plastic with various moisture contents from suppliers A and B laminated to clear plate and float glass. The performance of laminates of half-clear and half-tinted interlayers with tinted plate glass and tinted float glass is shown in table VIII-B.

TABLE VIII-B

PERFORMANCE OF TINTED PLATE AND FLOAT GLASS LAMINATES

| Glass | Interlayer Supplier | Average % Moisture Content | MBH |
|---|---|---|---|
| Tinted Plate | B | 0.30% | 18.5 ft. |
| Tinted Plate | B | 0.39 | 19.1 |
| Tinted Plate | B | 0.55 | 19.6 |
| Tinted Plate | A | 0.31 | 18.8 |
| Tinted Plate | A | 0.38 | 19.7 |
| Tinted Plate | A | 0.51 | 19.9 |
| Tinted Float | B | 0.29 | 20.2 |
| Tinted Float | B | 0.40 | 20.1 |
| Tinted Float | B | 0.57 | 19.6 |
| Tinted Float | A | 0.32 | 20.2 |
| Tinted Float | A | 0.36 | 21.1 |
| Tinted Float | A | 0.55 | 22.9 |

The above tests involving 240 samples indicated a slightly better penetration resistance for laminates with dyed plastic than for those with clear plastic interlayers. Also, in both instances, the penetration resistance improved with increased moisture content in the interlayer, as was expected.

In the laboratory tests the harness of the water used to rinse the glass was increased to the desired levels by adding appropriate quantities of two salts ($CaCl_2$ and $MgSO_4$) to demineralized water.

Experiments were conducted to compare the performance of laminates containing glass rinsed with water hardened to 400 parts per million hardness by adding two salts ($CaCl_2$ and $MgSO_4$) with laminates containing glass rinsed with water hardened by adding only one salt ($CaCl_2$ or $MgSO_4$).

The first experiment using 12 laminates per variation or a total of 36 laminates compared city water treatment with hardening treatments involving one salt ($CaCl_2$) in the hardener versus two salts ($CaCl_2$ and $MgSO_4$). Rinsing the glass prior to bending with water having a hardness of 400 parts per million produced by adding the two salts ($CaCl_2$ and $MgSO_4$) resulted in significantly better penetration resistance than rinsing with water hardened to 400 parts per million by adding only one salt ($CaCl_2$). The laminates containing glass subjected to water hardened by adding the two salt rinse showed a Mean Break Height of 15.6 feet and the laminates comprising glass treated with water hardened with the one salt rinse only 12.5 feet. Both sets of laminates were much safer than laminates containing glass sheets treated with city water.

One of the glass sheets in each sample for these experiments was sprayed prior to lehr treatment to simulate bending with a diatomaceous earth dispersion made using city tap water having a hardness of 140 parts per million.

Clear plate glass and clear plastic from supplier A at a moisture content of 0.34–0.36 percent were used in the fabrication of the test laminates.

In a similar experiment on laminates having interlayers of a different range of moisture contents, 12 laminates per variation or a total of 24 laminates were used to compare the Mean Break Height of laminates containing glass sheets rinsed prior to simulated bending with water hardened to a hardness of 400 parts per million by adding the two salt additives with that of laminates comprising glass sheets rinsed with water hardened by adding only $MgSO_4$. Significantly better penetration resistance was observed in those laminates subjected to treatment by water hardened with the two salt system than those containing glass sheets treated with water hardened by an addition of $MgSO_4$ alone.

As in the first experiment, clear plate glass and clear interlayer was used in the fabrication of the test laminates. Moisture content of the interlayer was 0.29 to 0.30 percent in this latter experiment.

The test results for each variation of the above experiments are shown in table IX-A which compares the two salt water hardening treatment with $CaCl_2$ hardened water and tap water and in table IX-B, which compares the two salt treatment with $MgSO_4$ water hardening treatment.

TABLE IX-A

COMPARISON OF LAMINATES COMPRISING GLASS SHEETS RINSED WITH UNTREATED CITY WATER AND WATER HARDENED BY $CaCl_2$ AND BY A TWO SALT MIXTURE

| Glass | Water Hardness Rinse | Average Moisture Content | MBH |
|---|---|---|---|
| Clear Plate | 400 p.p.m. ($CaCl_2+MgSO_4$) | 0.34% | 15.6 ft. |
| Clear Plate | 400 p.p.m. ($CaCl_2$ only) | 0.36 | 12.5 |
| Clear Plate | 140 p.p.m. (city water) | 0.35 | 9.2 |

TABLE IX-B

COMPARISON OF LAMINATES COMPRISING GLASS SHEETS RINSED WITH WATER HARDENED BY $MgSO_4$ AND THOSE HARDENED BY A TWO SALT MIXTURE

| Glass | Water Hardness Rinse | Average Moisture Content | MBH |
|---|---|---|---|
| Clear Plate | 400 p.p.m. ($CaCl_2+MgSO_4$) | 0.29% | 14.7 ft. |
| Clear Plate | 400 p.p.m. ($MgSO_4$) | 0.30 | 10.0 |

EXAMPLE X

Having demonstrated in tables said slats, and IX-B that rinsing glass sheets with a mixture of $MgSO_4$ and $CaCl_2$ to increase the water hardness before laminating the rinsed sheets produces safer laminates than those containing glass sheets treated with water hardened to the same hardness by adding one or the other of said slats, another experiment was performed to determine whether an optimum ratio of the salts existed. To accomplish this end, 50 additional laminates each comprising 2 glass sheets 12 inch by 12 inch by one-eighth inch nominal thickness and an interlayer sheet of polyvinyl butyral 0.030 inch thick were assembled, 10 of each of five variations. The water used to treat the glass sheets comprising each set of laminates was treated demineralized water that was hardened to a hardness of 400 parts per million using a different ratio of equivalent weights of calcium to magnesium for each set by adding mixtures of $CaCl_2$ and $MgSO_4$ in different ratios to demineralized water to treat each set, the sheets so treated were laminated and segregated into five sets of 10 laminates each one set for each ratio, and subjected to the ball drop test described above to determine Mean Break Height for each set. Table X shows the results of the tests performed on these BY five sets of laminates.

TABLE X

COMPARISON OF MEAN BREAK HEIGHTS OF LAMINATES COMPOSED OF GLASS SHEETS TREATED WITH 400 HARDNESS WATER PRODUCED by ADDING DIFFERENT EQUIVALENT WEIGHT RATIOS OF CALCIUM TO MAGNESIUM

| Equivalent Weight Ratio Ca/Mg | Average Moisture Content of Interlayer | MBH (Feet) |
|---|---|---|
| 4/1 | 0.33% | 20.4 |
| 2/1 | 0.40% | 20.9 |
| 1/1 | 0.34% | 17.8 |
| 1/2 | 0.30% | 15.4 |
| 1/4 | 0.33% | 18.3 |

The above test indicated a significant improvement in results when the glass sheets are treated with a mixture containing more calcium ions than magnesium ions.

While calcium chloride and magnesium sulfate are used as the salts to promote water hardness because of their availability and economy, it is understood that any other water soluble salt of calcium, such as calcium bromide, calcium salicylate, calcium sulfhydrate, calcium thiocarbonate, calcium thiocyanate, and the like, may be used as a source of calcium ions in lieu of calcium chloride and that any other water soluble magnesium salt, such as magnesium acetate, magnesium ammonium chromate, magnesium orthoarsenite, magnesium chlorate, magnesium chloride, magnesium selenate, magnesium sodium chloride, magnesium thiosulfate, and the like, may be used as a source of magnesium ions, in lieu of magnesium sulfate.

The following conclusions were drawn from the experimental program described above.

1. The penetration resistance of a safety glass laminates can be improved by treating the glass sheets with hard water during a final rinse before laminating rather than with demineralized water or steam.
2. The penetration resistance of safety glass laminates is generally better when the hard water used for rinsing contains a significant amount of both calcium ions and magnesium ions, preferably more calcium ions than magnesium ions.
3. The improvement in penetration resistance increases with increased water hardness, but is not significant for hardness in excess of about 400 parts per million.
4. Improvement in penetration resistance of the laminated windshield occurs whenever the hard water rinse is performed either before or after bending. However, a subsequent soft water rinse or steam treatment reduces the benefits obtained from the hard water treatment. Therefore, it is recommended that the last water treatment before lamination be made with water having a hardness between about 200 and about 400 parts by weight per million parts of water.

EXPLOITATION OF THE INVENTION

In an illustrative embodiment using the present invention, city tap water is used for all the glass sheet washing, but the final rinsing of the glass before lamination is done using water of controlled hardness (about 400 parts per million calculated as $CaCO_3$). An aqueous spray of diatomacious earth is applied as a parting material to a finally rinsed surface before bending. The water to be hardened is heated and filtered. Four polyethylene tanks of 50 gallons capacity each are used to store the additives (calcium chloride and magnesium sulfate) to increase the rinse water hardness. A Hack C.R. Hardness Monitor/Alarm, supplied by the Hack Chemical Company of Ames, Iowa, monitors the hardness of the hardened rinse water. The alarm provided with the hardness tester calls attention to plant personnel whenever the hardness is outside the range desired so that the rate of flow of highly concentrated solutions of calcium chloride and magnesium sulfate from the polyethylene tanks into the rinse water tank can be controlled.

Two of the four polyethylene tanks are used to store and supply a concentrated aqueous solution of calcium chloride. The other two polyethylene tanks are used to store and supply a concentrated aqueous solution of magnesium sulfate. One of each pair of tanks supplies the two ingredients to harden the water while the other tank in each pair is used to prepare and mix additional concentrated solution for use when the first storage tanks are depleted and vice versa.

The two 50 gallon tanks for calcium chloride solution contain 118 pounds of calcium chloride in the full tanks, whereas the two 50 gallon tanks for magnesium sulfate solution contain 62 pounds of magnesium sulfate dissolved in the full tank. When smaller amounts of solution are added to the storage tanks, the corresponding salts are added in said proportion (about 2 Ca ions per Mg ion).

Laminated safety glass windshields comprising glass sheets processed by hard water as taught by the present invention add an additional factor of safety to all the other safety factors that have been developed previously by prior art interlayer and glass treatments.

We claim:

1. In the art of bending and laminating glass sheets to produce safe laminated windshields comprising a pair of curved glass sheets and an interlayer of plasticized polyvinyl butyral, wherein a pair of glass sheets is bent to matching curvature and then laminated to opposite sides of a sheet of plasticized polyvinyl butyral, the improvement comprising:
    a. measuring the hardness of a supply of water used in a final rinse of said glass sheets before they are laminated,
    b. adding sufficient additive aqueous solution of a water-soluble metal salt having a cation taken from the family consisting of calcium and magnesium and mixtures thereof in a concentration sufficiently greater than 400 parts per million to increase the hardness of said water to between about 200 and about 400 parts by weight calculated as calcium carbonate per million parts by weight of solution, and
    c. rinsing the glass sheets with said treated water at a temperature below the boiling point of said water before the glass sheets are laminated.

2. The improvement according to claim 1, wherein said glass sheets are rinsed with said treated water having a hardness of about 400 parts by weight calculated as calcium carbonate per million parts by weight of solution before they are bent.

3. The improvement according to claim 2, wherein said glass sheets are rinsed with said water treated to have a hardness of about 200 parts by weight calculated as calcium carbonate per million parts by weight of solution after they are bent and before they are laminated.

4. The improvement as in claim 1 wherein said additive solution contains a mixture of calcium ions and magnesium ions.

5. The improvement as in claim 4, wherein said added solution contains calcium chloride and magnesium sulfate as essential ingredients.

6. The improvement as in claim 4, wherein a greater amount of calcium ions than magnesium ions are included in said additive solution.

7. The improvement according to claim 6, wherein the ratio of calcium ions to magnesium ions in said additive solution is approximately 2 to 1.

8. The improvement according to claim 1, wherein the glass sheets so treated are composed of float glass.

9. The improvement according to claim 1, wherein at least one of said sheets to be laminated is treated at a temperature below the boiling point of water with an aqueous dispersion of a diatomaceous earth on a surface previously rinsed with water having a hardness of approximately 400 parts by weight per million calculated as calcium carbonate.